(12) United States Patent
Wallenius

(10) Patent No.: US 6,466,786 B1
(45) Date of Patent: Oct. 15, 2002

(54) CALL SET-UP IN MOBILE COMMUNICATIONS SYSTEM

(75) Inventor: Jukka Wallenius, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/319,516

(22) PCT Filed: Dec. 4, 1997

(86) PCT No.: PCT/FI97/00758

§ 371 (c)(1),
(2), (4) Date: Jun. 21, 1999

(87) PCT Pub. No.: WO98/25430

PCT Pub. Date: Jun. 11, 1998

(30) Foreign Application Priority Data

Dec. 4, 1996 (FI) .............................................. 964857 U

(51) Int. Cl.[7] .............................. H04Q 7/20; H04Q 7/36
(52) U.S. Cl. ...................... 455/433; 455/432; 455/404; 455/527; 455/403; 455/414; 455/521
(58) Field of Search ................................ 455/432, 433, 455/435, 422, 440, 404, 527, 445, 403, 412, 414, 424, 425, 9, 517, 512, 521, 550, 552

(56) References Cited

U.S. PATENT DOCUMENTS

| | | | |
|---|---|---|---|
| 4,953,202 A | | 8/1990 | Newell ........................ 379/200 |
| 5,473,671 A | * | 12/1995 | Partridge, III ............... 455/414 |
| 5,765,108 A | * | 6/1998 | Martin et al. ................ 455/414 |
| 5,815,808 A | * | 9/1998 | Valentine ..................... 455/414 |
| 5,845,219 A | * | 12/1998 | Heriksson .................... 455/567 |
| 5,890,061 A | * | 3/1999 | Timm et al. ................. 455/404 |
| 5,960,338 A | * | 9/1999 | Foti ............................ 455/414 |

FOREIGN PATENT DOCUMENTS

| | | |
|---|---|---|
| EP | 0 600 401 | 6/1994 |
| WO | WO 95/05721 | 2/1995 |
| WO | WO 95/28972 | 10/1995 |

OTHER PUBLICATIONS

Copy of the International Search Report for PCT/FI97/00758.
Mouly, et al., *The GSM System for Mobile Communications*, 1992.

* cited by examiner

Primary Examiner—William Trost
Assistant Examiner—Keith Ferguson
(74) Attorney, Agent, or Firm—Altera Law Group, LLC

(57) ABSTRACT

In a call set-up method a called mobile station is checked upon routing an incoming call to see if incoming calls are barred. In prior art call set-up an incoming call barring prevents the routing of all calls destined to the mobile station. The call set-up method of the present invention is characterized by bypassing the incoming call barring in the case of a priority call. The invention also relates to a mobile communications system comprising a first subscriber register for permanent storage of subscriber data and a second subscriber register for temporary storage of subscriber data. Incoming call barring is set in subscriber data. The mobile communications system of the invention is characterized by the system begin arranged to bypass the incoming call barring in the case of a priority call.

20 Claims, 3 Drawing Sheets

CALL SET-UP IN MOBILE COMMUNICATIONS SYSTEM

FIELD OF THE INVENTION

The invention relates to a call set-up method in a mobile communications system, in which method a called mobile station is checked upon routing an incoming call to see if incoming call barring is activated.

The invention further relates to a mobile communications system comprising a first subscriber register for permanent storage of subscriber data and a second subscriber register for temporary storage of subscriber data, in which subscriber data incoming call barring is set.

BACKGROUND OF THE INVENTION

In the mobile communications system the incoming calls to the mobile station subscriber are routed on the basis of the location information stored in a visitor register. However, the mobile station subscriber does not necessarily always want to receive incoming calls. Then the number of calls to be routed can be restricted e.g. by using call barring or call forwarding. For example in the GSM mobile communications system the subscriber can prevent the connecting of incoming calls when the mobile station is located outside its home network, or the connecting of all incoming calls. The closed user group also determined for a mobile communications system restricts the connecting of incoming calls. Only calls between subscribers within a group are allowed to the closed user group. For other subscribers the closed user group bars the routing of a call.

FIG. 1 of the accompanying drawings shows a simplified block diagram of the Pan-European GSM mobile communications system. Mobile Station MS is through a radio path connected to a Base Transceiver Station BTS, in the case shown in FIG. 1 to base station BTS1. Base Station System BSS consists of Base Station Controller BSC and base transceiver stations BTS which are controlled by BSC. Mobile Services Switching Centre MSC usually controls several base station controllers BSC. Mobile services switching centre MSC communicates with other mobile services switching centres and through Gateway Mobile Services Switching Centre GMSC the GSM network joins other networks, such as Public Switching Telephone Network PSTN, another Public Land Mobile Network PLMN, Integrated Services Digital Network ISDN or Service Centre SC. Operation and Maintenance Centre OMC observes the function of the entire system. The subscriber, data of mobile station MS are permanently stored in Home Location Register HLR of the system and temporarily stored in that particular Visitor Location Register VLR in the area of which mobile station MS happens to be located. Information about visitor location register VLR within the area of which mobile station MS is located, is updated to home location register HLR upon location updating. Mobile station MS location information is stored in visitor location register VLR with an accuracy of Location Area LA.

FIG. 2 of the accompanying drawings illustrates a normal mobile terminating call set-up in the GSM-type mobile communications system. Only the network elements that are relevant to the call set-up signalling are shown in the Figure. A call initiated by subscriber A is routed from the network of subscriber A, which can be for example a public land mobile network PLMN, an intelligent network IN or a public switching telephone network PSTN, to the gateway mobile services switching centre GMSC of the PLMN home network of subscriber B, which GMSC sends an inquiry (message 1) about the routing information to home location register HLR of subscriber B. Home location register HLR checks from the subscriber data of mobile station MS whether an incoming call barring or a user group code for restricting calls to a closed user group has been set for the mobile station. If the barring or the user group code have not been set, home location register HLR sends a roaming number request for visitor location register VLR at the location area of mobile station MS in message 2. Visitor location register VLR reserves Mobile Station Roaming Number MSRN and sends the number to home location register HLR in reply message 3. Home location register HLR sends the roaming number further to gateway mobile services switching centre GMSC that inquired about routing information in message 4. After this, gateway mobile services switching centre GMSC can on the basis of the roaming number route the call further to mobile services switching centre MSC of subscriber B using call set-up message 5. Mobile services switching centre MSC detects on the basis of mobile station roaming number MSRN that the called mobile station MS is located in the area controlled by mobile services switching centre and requests the subscriber data (message 6) of the called mobile station from visitor location register VLR. A user group code or user group codes for restricting calls to a closed user group may also have been set on visitor location register, whereby visitor location register VLR prevents during the inquiry stage of the subscriber data the further routing of the call if the user group code does not match. If the user group barring has not been set on visitor location register VLR it sends the required subscriber data to mobile services switching centre MSC in message 7. In step 8 a normal mobile station MS page and a call set-up are performed when mobile station MS has responded.

If the subscriber data stored in home location register HLR of mobile station MS comprise an incoming call barring or a user group code, that differs from the CUG interlock code transmitted in the call set-up message, a roaming number request is not sent to visitor location register VLR but the call set-up is interrupted. Home location register HLR replies to the inquiry about routing information sent by gateway mobile services switching centre GMSC (message 1 in FIG. 2) informing with message 4 in FIG. 2 that the routing of the call cannot be done. The call attempt initiated by subscriber A is aborted and an announcement about the prevention of the call set-up is sent to subscriber A. Correspondingly, if the user group barring has been set on the subscriber data of visitor location register VLR, visitor location register VLR does not send the requested subscriber data to mobile services switching centre MSC but sends a notice about the interruption of the call set-up.

A problem with said call barrings is that the barring applies to all calls irrespective of their importance. Thus, the routing of the call is interrupted also e.g. in respect of an absolutely important announcement call initiated by the intelligent network, such as a wake-up call or an announcement about the number of prepaid call minutes.

SUMMARY OF THE INVENTION

An object of the present invention is to enable a call set-up of individual subscribers A when incoming calls to subscriber B are barred.

This new type of call set-up is achieved with the method of the invention characterized by bypassing, in this method, the incoming call barring in the case of a priority call.

The mobile communications method of the invention set forth in the preamble characterized by the mobile communications system being arranged to bypass an incoming call barring in the case of a priority call.

The invention is based on the idea that individual subscribers A are provided with a bypass of call set-up barring. The priority subscriber identifier is transmitted as a supplement to the call set-up signalling of a subscriber A entitled to bypass call barring, on the basis of said identifier the barring functionality is bypassed upon call set-up and the call is routed to subscriber B.

An advantage of such a call set-up is that the barring of a call can be bypassed in respect of an important call.

BRIEF DESCRIPTION OF THE DRAWINGS

In the following, the invention will be described in greater detail in connection with the preferred embodiments with reference to the accompanying drawings, in which.

DETAILED DESCRIPTION OF THE PREFERRED EMBODIMENTS

Figure 1:
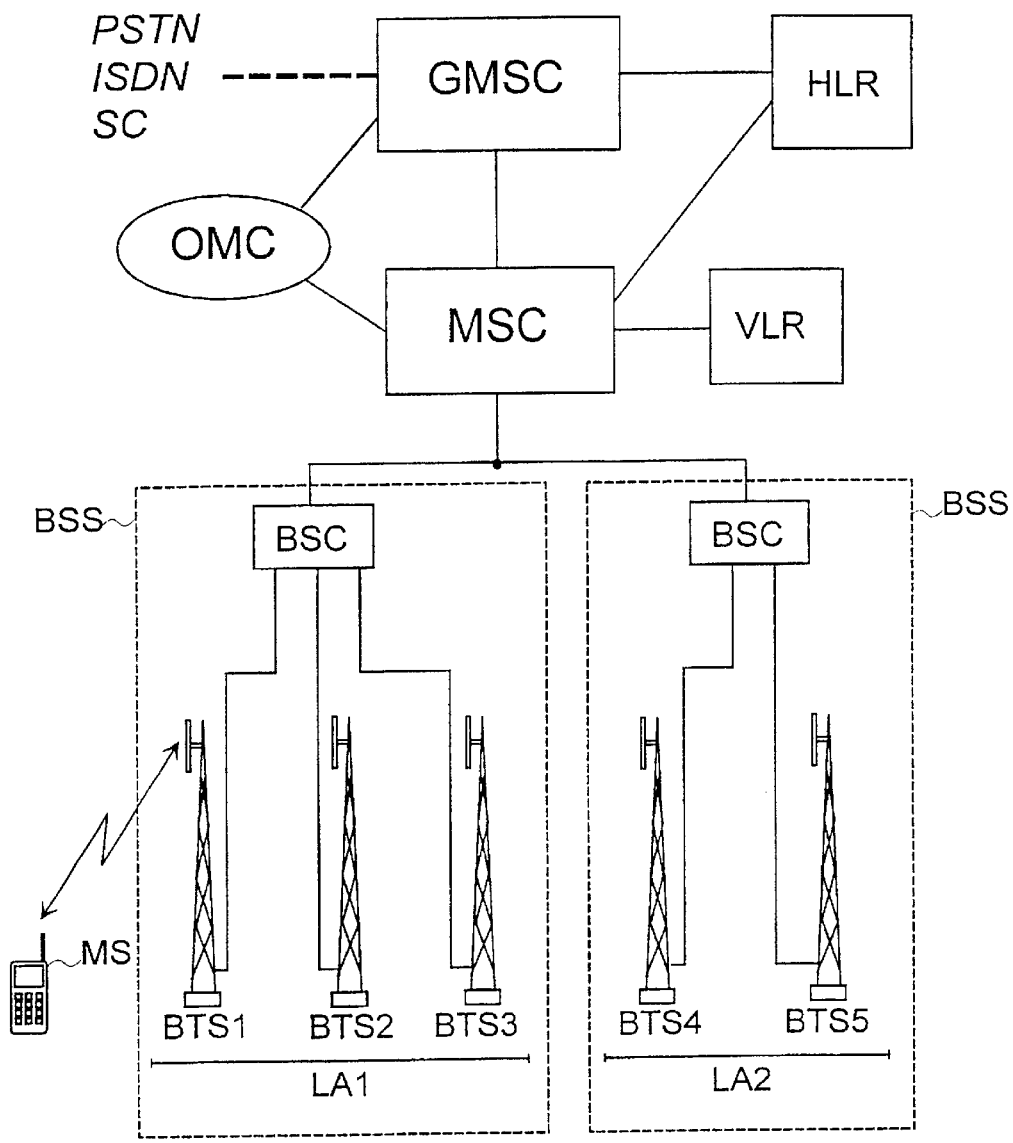
FIG. 1 shows the parts of the mobile communications network that are essential to the invention.

The present invention can be applied to any mobile communications system. Below the invention is described in greater detail by way of example particularly in connection with the Pan-European digital GSM mobile communications system. FIG. 1 shows the simplified structure of the GSM network described earlier. With respect to the more detailed description of the GSM system reference is made to the GSM references and to the book "The GSM System for Mobile Communications", M. Mouly & M. Pautet, Palaiseau, France, 1992, ISBN:2-9507190-0-7.

What is meant by incoming call barring in this application is any barring set for a mobile station, on the basis of which the routing of the call to the mobile station is interrupted. Examples of call barring are: incoming call barring, incoming call barring when the mobile station is located outside its home network, call forwarding and a closed user group in respect of subscribers not belonging to the group. Although call forwarding does not actually prevent call set-up but forwards a call to another number than to the one subscriber A has called, the functionality of the present invention can also be utilized in this case so that the call can be routed to the mobile station, for which e.g. the announcement call is destined.

An incoming call may also be a special function of the network, such as an announcement to a subscriber. Such a special call can come from the service control point of the intelligent network (IN) in an SCP message INITIATE_CALL_ATTEMPT also comprising the number (ISDN-B) of subscriber B and the calling subscriber identity (CLI).

Figure 2:
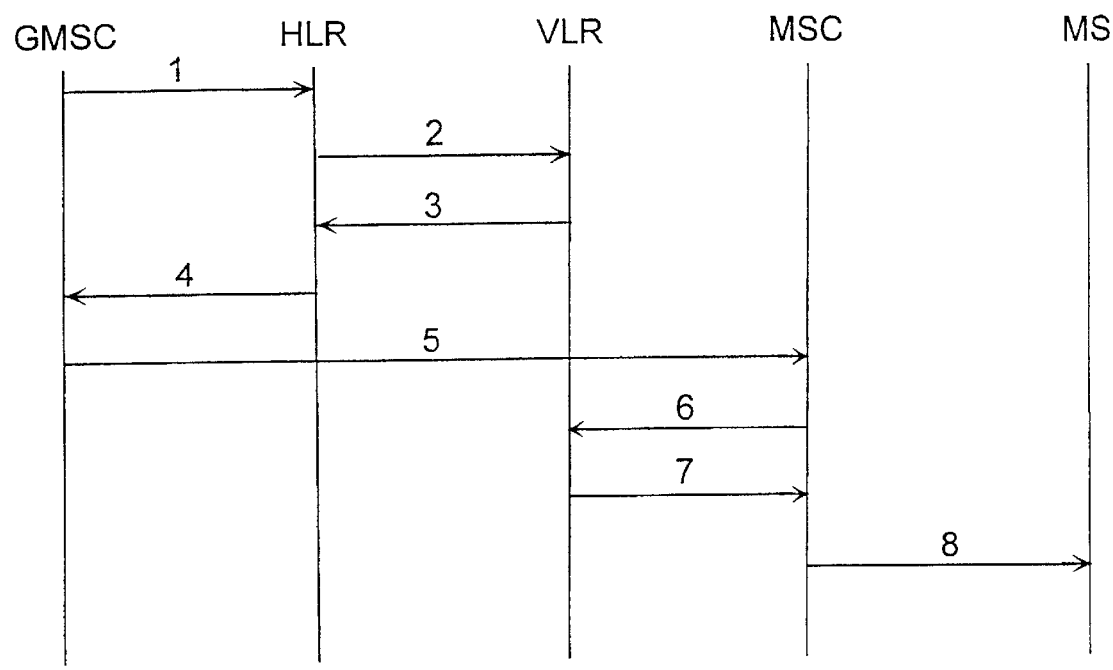
FIG. 2 shows the call set-up as a signalling diagram in the GSM mobile communications system.

FIG. 2 illustrates signalling associated with call set-up described earlier in connection with prior art call set-up. In the following, the invention will be described in greater detail in connection with a primary embodiment with further reference to FIG. 2. In this embodiment the bypass of call barring is associated with message 1 of FIG. 2. The call initiated by subscriber A is routed to gateway mobile services switching centre GMSC. Using MAP signalling of the GSM system gateway mobile services switching centre GMSC sends an inquiry with message SEND_ROUTING_INFORMATION (message 1) concerning routing information to home location register HLR. In the primary embodiment of the invention the priority subscriber identifier data, in this case a subscriber class of a calling subscriber (subscriber A), is added to the operator-specific field of this message. The subscriber classes entitled to bypass call barring are determined and subscriber A's subscriber class transmitted upon call set-up is compared with the determined priority subscriber classes. For example the values of the general subscriber class of the telecommunications network: an operator, a wake-up device, a priority user, a test user etc. can be determined to belong to the group of priority users the present invention refers to. The call barring bypass in accordance with the invention is carried out when the subscriber class is found in the priority list. On the basis of this identifier data home register HLR detects that the calling subscriber is entitled to bypass the possible call barring. When home location register HLR detects such identifier data it bypasses the incoming call barring established for the mobile station and performs the call set-up similarly as if no call barring had been set. In respect of the other messages of FIG. 2 the call set-up of the mobile communications system utilizing the primary embodiment of the method of the invention is similar to a successful call set-up of the prior art described above. Thus, home location register HLR sends in message 2 of FIG. 2 a roaming number request to visitor location register VLR, to which request visitor location register VLR replies by sending the reserved mobile station roaming number MSRN in message 3. In message 4 home register sends the roaming number to gateway mobile services switching centre GMSC that required the routing information, and on the basis of the roaming number the gateway mobile services switching centre GMSC routes the call to the correct mobile services switching centre MSC (message 5). In message 6 mobile services switching centre MSC requests subscriber data from visitor location register VLR which replies by sending the requested subscriber data in message 7. Mobile station MS page and the connecting of the call is conducted in step 8.

In the other primary embodiments of the invention appropriate identifier data can be used as an indication of the importance of the call and as an identifier of a priority subscriber e.g. subscriber A's number or a particular important data parameter. The identifier data is compared with a predetermined list of identifiers entitled to call barring bypass. The interpretation of the identifier data entitled to bypass the call barring in accordance with the present invention is preferably performed in the particular element of the mobile communications system where the barring functionality is located e.g. in home location register HLR as described above in connection with the primary embodiment. The interpretation of the identifier data of the invention can also be performed in another network element suitable for the purpose e.g. in gateway mobile services switching centre GMSC. Then gateway mobile services switching centre GMSC interprets on the basis of subscriber A's identifier of the call routed to gateway mobile services switching centre GMSC, e.g. a subscriber class, if the call is entitled to bypass the call barring and connects a particular parameter to the inquiry about the routing information of priority calls, on the basis of which parameter the element implementing the barring functionality, e.g. home location register HLR, bypasses the call barring and proceeds normally with the routing of the call.

In the following, the primary embodiment of the call set-up method of the present invention is described in the flow diagram of FIG. 3. The call initiated by subscriber A is routed to gateway mobile services switching centre GMSC that sends an inquiry about routing information to home location register HLR of subscriber B (block 31). In block 32 home location register HLR checks in accordance with the present invention, if an identifier is connected to the inquiry about routing information, e.g. the subscriber class or the number of subscriber A, which would identify the call in progress as a priority call. If subscriber A is detected as a priority subscriber of the invention the call barring check of block 33 is bypassed and the call set-up is continued from block 34. In block 34 home location register HLR sends visitor location register VLR a roaming number request, to which visitor location register VLR replies by sending mobile station roaming number MSRN reserved for the call to home location register HLR. Home location register HLR transmits the roaming number further to gateway mobile services switching centre GMSC. The call is routed on the basis of the roaming number to subscriber B and a speech connection is established to mobile station MS (block 35).

Figure 3:
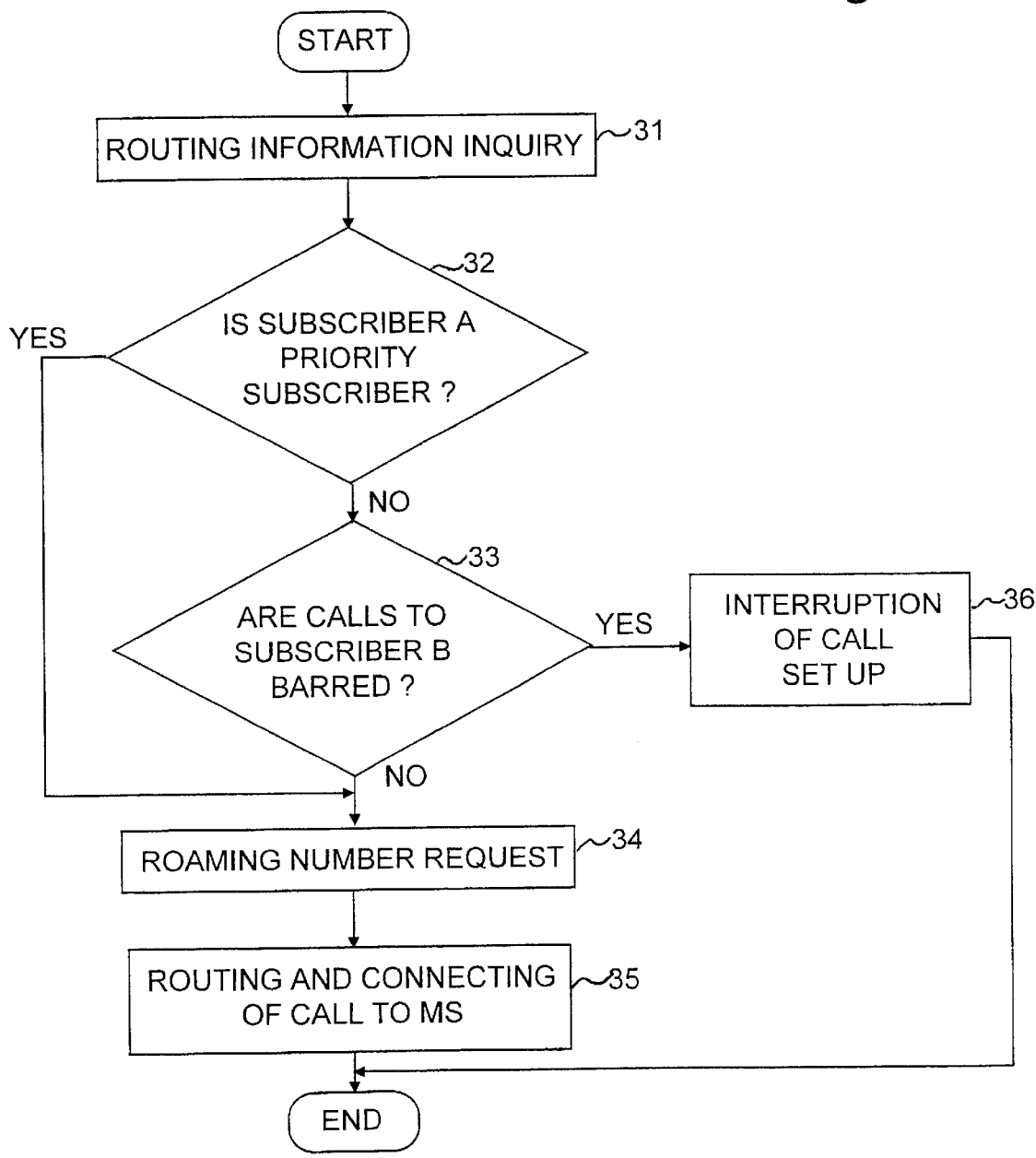
FIG. 3 shows the call set-up method of the invention as a flow diagram.

If home location register HLR detects in block 32 of FIG. 3 that subscriber A is not entitled to bypass the call barring, then the call set-up is performed in accordance with prior art, whereby home location register HLR checks in block 33, if incoming calls to subscriber B are barred. The call set-up then proceeds as described in the above prior art description either by interrupting the call set-up (block 36) if the incoming calls have been barred or by routing the call to mobile station MS (blocks 34–36) if no barring has been set.

The invention will next be described in greater detail in connection with the secondary embodiment with further reference to FIG. 2. In this embodiment the call barring bypass is associated with messages 1, 5 and 6 of FIG. 2. In the secondary embodiment of the invention the inquiry about routing information is performed as described above in the primary embodiment of the invention. The call initiated by subscriber A is routed to gateway mobile services switching centre GMSC which sends the routing information inquiry with message SEND_ROUTING_ INFORMATION (message 1) to home location register HLR. The priority subscriber identifier data is added to the operator-specific field of this message in accordance with the present invention. On the basis of this identifier data home location register HLR detects that the subscriber is entitled to bypass the possible call barring. When home location register HLR detects such identifier data it bypasses the incoming call barring set for the mobile station and performs its part of the call set-up in the same way as if no call barring had been set. Thus, home location register HLR sends in message 2 of FIG. 2 to visitor location register VLR a roaming number request, to which visitor location register VLR replies by sending reserved served mobile station roaming number MSRN in message 3. In message 4 home register sends the roaming number to gateway mobile services switching centre GMSC which requested the routing information. On the basis of the routing number gateway mobile services switching centre GMSC routes in message 5 the call to proper mobile services switching centre MSC, in whose operator-specific field the priority subscriber identifier data is added in accordance with the secondary embodiment of the invention. In message 6 MAP_SEND_ INFO_FOR_INCOMING_CALL mobile services switching centre MSC requests the subscriber data of the called mobile station from visitor location register VLR. The priority subscriber identifier data, e.g. the identifier transmitted from gateway mobile services switching centre GMSC in message 5 above, is added to subscriber data request message 6. On the basis of identifier data visitor location register VLR detects that the calling subscriber is entitled to bypass user group barring possibly set on the visitor register, whereby visitor location register VLR bypasses the possible call barring and replies to mobile services switching centre MSC by sending the requested subscriber data in message 7. Mobile station MS page and call connecting are performed in message 8 as described above in the description of the prior art.

In the following, the invention will be described in more detail in connection with the third embodiment of the invention with further reference to FIG. 2. In this embodiment the call barring bypass is associated with messages 1 and 5 and step 8 of FIG. 2. In the third embodiment of the invention the routing information inquiry is performed in the same way as in the primary embodiment of the invention described above. The call initiated by subscriber A is routed to gateway mobile services switching centre GMSC which sends the inquiry about routing information with message SEND_ROUTING_INFORMATION (message 1) to home location register HLR. The priority subscriber identifier data is added to the operator-specific field of this message in accordance with the invention, on the basis of which home location register HLR detects that the calling subscriber is entitled to bypass the call barring possibly set. When home location register HLR detects such identifier data it bypasses the incoming call barring set for the mobile station and performs the call set-up in the same way as if no call barring had been set. Thus, home location register HLR sends in message 2 of FIG. 2 a roaming number request to visitor location register VLR, to which visitor location register VLR replies by sending mobile station roaming number MSRN in message 3. Home register sends in message 4 the routing number to gateway mobile services switching centre GMSC which inquired about the routing information. On the basis of the routing number gateway mobile services switching centre GMSC routes the call to proper mobile services switching centre MSC in message 5, in whose operator-specific field the priority subscriber identifier data is added as described above in connection with the secondary embodiment. In message 6 mobile services switching centre MSC inquires about the subscriber data of the called mobile station from visitor location register VLR which replies to mobile services switching centre MSC by sending the requested subscriber data in message 7. In step 8 mobile station MS is paged and the priority subscriber identifier data, e.g. the identifier transmitted from gateway mobile services switching centre GMSC above in message 5, is connected to the speech connection set-up message which is to be sent upon call set-up. On the basis of the identifier data mobile station MS for example bypasses the manufacturer-specific call barring possibly set at the mobile station. If mobile station MS enables the selection of different ringing tones for an incoming call, then the above described identifier data can be utilized when selecting the ringing tone.

The functionality of the present invention can also be implemented as a combination of the secondary and the third embodiments described above. In this case a possible incoming call barring is bypassed in home location register HLR, in visitor location register VLR and in mobile station MS on the basis of the priority subscriber identifier data connected to the call set-up signalling.

The drawings and the attached description are only meant for illustrating the idea of the invention. The details of the call set-up of the invention may vary within the scope of the claims. Even though the invention has above been described mainly in connection with an incoming call, the described functionality can be used in other forms of telecommunication.

What is claimed is:

1. A call set-up method in a mobile communications system, in which method a called mobile station is checked upon routing an incoming call to see if incoming call barring is activated, the method comprising the steps of
   checking whether the call set-up signaling contain a priority call identifier,
   bypassing the checking of the incoming call barring or a possible incoming call barring on the basis of said identifier upon routing of the priority call, and
   connecting a call to a called mobile station.

2. A method as claimed in claim 1, in order to bypass the incoming call barring, the method further comprises the steps of:
   attaching the priority call identifier to a routing information inquiry message and
   bypassing the incoming call barring in a home location register on the basis of the identifier upon routing of the priority call.

3. A method as claimed in claim 2, in order to bypass the incoming call barring, the method further comprises the steps of:
   attaching the priority call identifier to a call routing message
   attaching the priority call identifier to a subscriber data inquiry message, and
   bypassing the incoming call barring in a visitor location register on the basis of said identifier upon routing of the priority call.

4. A method as claimed in claim 3, in order to bypass the incoming call barring, the method further comprises the steps of:
   attaching the priority call identifier to a call set-up message
   attaching the priority call identifier to speech connection set-up message, and
   bypassing the incoming call barring in a mobile station on the basis of said identifier upon routing of the priority call.

5. A method as claimed in claim 4, in order to connect a call to a call to a called mobile station, the method further comprising the step of
   selecting a mobile station alarm signal on the basis of said identifier.

6. A method as claimed in claim 2, in order to bypass the incoming call barring, the method further comprises the steps of:
   attaching the priority call identifier to a call set-up message
   attaching the priority call identifier to speech connection set-up message, and
   bypassing the incoming call barring in a mobile station on the basis of said identifier upon routing of the priority call.

7. A method as claimed in claim 6, in order to connect a call to a call to a called mobile station, the method further comprises the step of
   selecting a mobile station alarm signal on the basis of said identifier.

8. A method as claimed in claim 1, in order to bypass the incoming call barring, the method further comprises the steps of:
   attaching the priority call identifier to a call routing message
   attaching the priority call identifier to a subscriber data inquiry message, and
   bypassing the incoming call barring in a visitor location register on the basis of said identifier upon routing of the priority call.

9. A method as claimed in claim 8, in order to bypass the incoming call barring, the method further comprises the steps of:
   attaching the priority call identifier to a call set-up message
   attaching the priority call identifier to speech connection set-up message, and
   bypassing the incoming call barring in a mobile station on the basis of said identifier upon routing of the priority call.

10. A method as claimed in claim 9, in order to connect a call to a call to a called mobile station, the method further comprises the step of
    selecting a mobile station alarm signal on the basis of said identifier.

11. A method as claimed in claim 1, in order to bypass the incoming call barring, the method further comprises the steps of:
    attaching the priority call identifier to a call set-up message
    attaching the priority call identifier to speech connection set-up message, and
    bypassing the incoming call barring in a mobile station on the basis of said identifier upon routing of the priority call.

12. A method as claimed in claim 11, in order to connect a call to a called mobile station, the method further comprises the step of
    selecting a mobile station alarm signal on the basis of said identifier.

13. A method as claimed in claim 1, further comprising the step of recognizing the priority call on the basis of subscriber A's subscriber class.

14. A method as claimed in claim 1, further comprising the step of recognizing the priority call on the basis of subscriber A's number.

15. A method as claimed in claim 1, further comprising the step of comparing, in order to recognize the priority call, said identifier with a predefined identifier list.

16. A mobile communications system comprising a first subscriber register for permanent storage of subscriber data and a second subscriber register for temporary storage of subscriber data, in which subscriber data incoming call barring is set, the mobile communications system being arranged
    to attach a priority call identifier to call set-up signaling,
    to bypass the incoming call barring on the basis of said identifier upon routing of the priority call, and
    to connect the call to the called mobile station.

17. A mobile communications system as claimed in claim 16, wherein the home location register of the mobile communications system is arranged to bypass the incoming call barring on the basis of said identifier upon routing of the priority call.

18. A mobile communications system as claimed in claim 17, wherein the visitor location register is arranged to bypass the incoming call barring on the basis of the identifier upon routing of the priority call.

19. A mobile communications system as claimed in claim 16, wherein the visitor location register is arranged to bypass the incoming call barring on the basis of the identifier upon routing of the priority call.

20. A mobile communications system as claimed in claim 16, wherein the incoming call barring is set at a mobile station and the mobile station is arranged to bypass the incoming call barring on the basis of the identifier upon routing of the priority call.

* * * * *

UNITED STATES PATENT AND TRADEMARK OFFICE
CERTIFICATE OF CORRECTION

PATENT NO. : 6,466,786 B1
DATED : October 15, 2002
INVENTOR(S) : Jukka Wallenius It is certified that error appears in the above-identified patent and that said Letters Patent is hereby corrected as shown below:

<u>Title page,</u>
Item [86], change "Jun. 21, 1999" to -- Jul. 21, 1999 --
Item [30], change "964857 U" to -- 964857 --.

Signed and Sealed this

Twenty-eighth Day of October, 2003

JAMES E. ROGAN
*Director of the United States Patent and Trademark Office*